United States Patent [19]
Tymn

[11] Patent Number: 5,508,977
[45] Date of Patent: Apr. 16, 1996

[54] SERVICE TECHNICIAN TIME RECORDER

[75] Inventor: Gary P. Tymn, Sun Lakes, Ariz.

[73] Assignee: Simplex Time Recorder Company, Gardner, Mass.

[21] Appl. No.: 261,366

[22] Filed: Jun. 16, 1994

[51] Int. Cl.⁶ .......................... G04B 47/00; G06F 15/21; G06F 3/023
[52] U.S. Cl. ........................... 368/10; 368/111; 364/401; 364/705.06; 364/709.04
[58] Field of Search .................................. 368/9, 10, 12, 368/41–43, 110–113; 364/401, 464.01, 705.06, 709.04, 569; 546/20, 82

[56] References Cited

U.S. PATENT DOCUMENTS

| | | | |
|---|---|---|---|
| 4,164,038 | 8/1979 | Nachtigal | 364/705 |
| 4,445,181 | 4/1984 | Yatman | 364/464 |
| 4,460,965 | 7/1984 | Trehn et al. | 364/464 |
| 4,847,791 | 7/1989 | Martin et al. | 364/554 |
| 4,961,158 | 10/1990 | Sussman | 364/709.04 |
| 5,068,787 | 11/1991 | Pipella et al. | 364/406 |

OTHER PUBLICATIONS

Simplex Time/Data Systems brochure, "Free Yourself From Slow, Costly Time–Recording Systems," 4 pages, Jul. 1993.
Simplex Time Recorder Co. brochure, "Free Yourself From Slow, Costly Time–Recording Systems," 4 pages, Mar. 1993.

*Primary Examiner*—Vit W. Miska
*Attorney, Agent, or Firm*—Hamilton, Brook, Smith & Reynolds

[57] ABSTRACT

A time recorder stores on and off times of technician repair jobs and receives repair order numbers and flat rate times through a key pad input. The time recorder prints flag tickets on adhesive-backed paper for application to repair orders. The system also prints daily time cards and efficiency in progress reports when requested by a supervisor. Technicians are identified to the time recorder by key pad input or by a bar code wand and supervisors are identified through key pad input or badges having magnetic stripes.

22 Claims, 11 Drawing Sheets

| EMPLOYEE'S NAME | | NO. | | DATE | |
|---|---|---|---|---|---|
| | RECORD OF AVAILABLE TIME | | | | |
| | OTHER TIME | | OUT | | |
| | | | IN | | |
| | OVER-TIME | | OUT | | |
| | | | IN | | |
| DAILY TIME AND OPERATION TICKET | REGULAR TIME | | OUT | | |
| | | | IN | | |
| | | | OUT | | |
| | | | IN | | |
| | TOTAL AVAIL. TIME | | | | |

| R.O. NO. | TECH. PAY $ | OPER. TIME | W-TIME | ACTUAL TIME | OFF | 9 |
|---|---|---|---|---|---|---|
| EMP. / OPER. NO. | | | | | ON | |
| R.O. NO. W1 | TECH. PAY $ | OPER. TIME | W-TIME | ACTUAL TIME | OFF  17.0 MAY 10 | 8 |
| EMP. 005 / OPER. NO. | | | .5 | | 16.5 MAY 10  ON | |
| R.O. NO. 9123 | TECH. PAY $ | OPER. TIME | W-TIME | ACTUAL | OFF  16.5 MAY 10 | 7 |
| EMP. 005 / OPER. NO. | | 1.8 | | 1.8 | 14.7 MAY 10  ON | |
| R.O. NO. W5 | TECH. PAY $ | OPER. TIME | W-TIME | ACTUAL TIME | OFF  14.6 MAY 10 | 6 |
| EMP. 005 / OPER. NO. | | | 1.2 | | 13.4 MAY 10  ON | |
| R.O. NO. 4567 | TECH. PAY $ | OPER. TIME | W-TIME | ACTUAL TIME | OFF  13.3 MAY 10 | 5 |
| EMP. 005 / OPER. NO. | | .8 | | .8 | 12.5 MAY 10  ON | |
| R.O. NO. W2 | TECH. PAY $ | OPER. TIME | W-TIME | ACTUAL TIME | OFF  12.0 MAY 10 | 4 |
| EMP. 005 / OPER. NO. | | | .5 | | 11.5 MAY 10  ON | |

FIG. IAA

FIG. IA PRIOR ART

| FIG. IAA |
|---|
| FIG. IAB |

| R.O. NO. W6 | TECH. PAY $ | OPER. TIME | W-TIME | ACTUAL TIME | OFF 3  11.5 MAY 10 |
|---|---|---|---|---|---|
| EMP. 005 | OPER. NO. | | 1.2 | | ON  10.3 MAY 10 |

| R.O. NO. 5678 | TECH. PAY $ | OPER. TIME | W-TIME | ACTUAL TIME | OFF 2  10.2 MAY 10 |
|---|---|---|---|---|---|
| EMP. 005 | OPER. NO. | 1.6 | | 1.2 | ON  9.0 MAY 10 |

| R.O. NO. 1234 | TECH. PAY $ | OPER. TIME | W-TIME | ACTUAL TIME | OFF 1  9.0 MAY 10 |
|---|---|---|---|---|---|
| EMP. 005 | OPER. NO. | 1.0 | | .9 | ON  8.1 MAY 10 |

| NOTE! W-5 | TOTAL | TOTAL | | TOTAL AVAIL.TIME |
|---|---|---|---|---|
| REPAIR JOB | | 5.2 | | 8.1  A |
| CHARGE TO: | | PAID W-TIME | ACTUAL TIME → | 4.7  B |
| NAME | TIME | 1.7 | | |
| | | TOTAL | RECORDED W-TIME → | 3.4  D |
| CODING OF W-TIMES | | 6.9 | UNRECORDED W-TIME (C MINUS D) | ∅  E |
| | | F+G=H | | |

CODING OF W-TIMES

W1 = REPAIR OF EQUIPMENT TOOLS, FACILITIES AND CLEANING
W2 = WAITING TIME
W3 = TRAINING, SHOP CONFERENCES
W4 = PAID HOLIDAY AND OTHER PAID ABSENCES
W5 = WORKSHOP RECTIFICATION

DEALER COPY

FIG. 1AB

FIG. IBA

Weekly Summary
EFFICIENCY AND PRODUCTIVITY

FIG. IB PRIOR ART

| FIG. IBA |
|----------|
| FIG. IBB |

Month/Year: March '91

Technician's Name & No.: Mike Barker #22

| WEEKLY PERIOD | A AVAIL. TIME | B ACTUAL TIME | C TOTAL W-TIME | D RECD. W-TIME | E UN-RECD. W-TIME | F OPER. TIME | EFF. F/B ×100 = % | PROD. B/A ×100 = % | POTENTIAL AVAIL. HRS. | EVALUATION COMMENTS |
|---|---|---|---|---|---|---|---|---|---|---|
| 1 / 1 | 8.1 | 8.0 | .1 | | .1 | 5.8 | | | | |
| 2 / 4 | 29.3 | 29.3 | | | | 27.7 | 94.5 | 100 | | |
| 3 / 11 | 34.0 | 30.0 | 4.0 | 4.0 | | 24.8 | 82.6 | 88.2 | | |
| 4 / 18 | 20.5 | 20.2 | .3 | .3 | — | 20.6 | 101.9 | 98.5 | | |
| 5 / 25 | 27.9 | 27.4 | .5 | .5 | | 25.1 | 91.9 | 97.8 | | |
| TOTALS | 119.8 | 114.9 | 4.9 | 4.8 | .1 | 104.0 | 90.5 | 95.9 | | |

FIG. IBb

RECORDED W-TIME ANALYSIS

| HRS | W-1 | | W-2 | | W-3 | | W-4 | | W-5 | | TOTAL RECORDED W-TIME |
|---|---|---|---|---|---|---|---|---|---|---|---|
| | HRS | DATE | HRS | DATE | HRS | DATE | HRS | DATE | HRS | DATE | |
| 1 | | | | | | | | | | | |
| 2 | | | | | | | | | | | |
| 3 | | | | | | | | | | | |
| 4 | | | | | | | | | | | |
| 5 | | ✕ | | ✕ | | ✕ | | ✕ | | ✕ | |

```
EMP: 004      MAY 10, '93    OFF 10.4 (10:27)
RO: 12345                    ON* 08.0 (08:00)
FL-RT: 2.5                       ACTUAL: 2.4
```

FIG. 3A

```
            TIME CARD FOR G. JOHNSON (#4)
-------------------------------------------------
EMP: 4        MAY 10, '93    OFF 10:4 (10:27)
RO: 12345     FILE: 1        ON* 08:0 (08:00)
FL-RT 2.5                        ACTUAL: 2.4
-------------------------------------------------
EMP: 4        MAY 10, '93    OFF 11.4 (11:29)
RO:W2         FILE: 2        ON  10.4 (10:27)
              W-TM: 1.0
-------------------------------------------------
EMP: 4        MAY 10, '93    OFF 13.4 (13:26)
RO: 456789    FILE: 3        ON  12.0 (12:00)
FL-RT 1.5                        ACTUAL: 1.4
-------------------------------------------------
EMP: 4        MAY 10, '93    OFF 13.9 (13:54)
RO:W1         FILE: 4        ON  13.4 (13:27)
              W-TM: 0.5
-------------------------------------------------
EMP: 4        MAY 10, '93    OFF 14.9 (14:58)
RO: 987654    FILE: 5        ON  13.9 (13:54)
FL-RT 1.1                        ACTUAL: 1.0
-------------------------------------------------
EMP: 4        MAY 10, '93    OFF 16.5 (16:32)
RO: 987654    FILE: 5        ON  14.9 (14:58)
FL-RT 1.5     WARRANTY           ACTUAL: 1.6
-------------------------------------------------
TTL FL-RT     6.6 F    TTL AVAIL TM  7.9 A
PAID W-TM     0.5 G    ACTUAL TM     6.4 B
TOTAL         7.1 H    TOTAL W-TM    1.5 C
```

FIG. 3B

| JOBS IN PROGRESS REPORT | | | | |
|---|---|---|---|---|
| DATE | EMP # | NAME | RO# | TIME |
| 01/03/93 | 1 | J. HENDERSON | 245881 | 09:13 |
| 01/03/93 | 5 | B. SMITH | 493026 | 10:43 |
| 01/03/93 | 4 | G. JOHNSON | 508849 | 11:20 |
| 01/03/93 | 2 | H. SIMPSON | 743967 | 14:56 |

FIG. 3C

| EFFICIENCY AND PRODUCTIVITY REPORT 05/01/93 THRU 05/04/93 | | | | | |
|---|---|---|---|---|---|
| TECH | AVAIL TIME (A) | ACTL TIME (B) | TOTL W-TM (C) | FL-RT TIME (F) | % EFF F/B | % PROD B/A |
| J. HENDERSON #1 | 29.3 | 27.7 | 1.6 | 28.1 | 101.4 | 94.5 |
| H. SIMPSON #2 | 34.0 | 30.0 | 4.0 | 24.8 | 82.6 | 88.2 |
| W. JONES #3 | 20.5 | 20.2 | 0.3 | 20.6 | 101.9 | 98.5 |
| G. JOHNSON #4 | 27.9 | 27.4 | 0.5 | 25.1 | 91.6 | 98.2 |
| B. SMITH #5 | 26.4 | 25.4 | 1.0 | 28.3 | 111.4 | 96.2 |
|  | 138.1 | 130.7 | 7.4 | 126.9 | 97.0 | 94.6 |

FIG. 3D

```
          MISSED PUNCH ALERT!
========================
      YOU HAVE TRIED TO PUNCH 'ON'
  AN 'ON' PUNCH ALREADY EXISTS (SEE BELOW)
        PLEASE PUNCH 'OFF' FIRST OR
    IF YOU FORGOT A PREVIOUS 'OFF' PUNCH,
          HAVE A SUPERVISOR INPUT A
          MISSED 'OFF' PUNCH FOR YOU.

========================
         JOBS IN PROGRESS REPORT
----------------------------------------
  DATE    EMP#  NAME    R.O.#   TIME
----------------------------------------
 04/12/94   1   G.TYMN  12365   11:04
========================
             END OF REPORT
```

FIG. 3E

```
              RED MARK REPORT

----------------------------------------
EMP: 1      APR 14, '94     OFF 13.8 (13:49)
RO: 4589    FILE: 2         ON  13.5 (13:35)
FL-RT:                      ACTUAL: 0.3
----------------------------------------

----------------------------------------
EMP: 1      APR 14, '94     OFF 13.8 (13:51)
RO:         FILE: 3         ON  13.8 (13:49)
FL-RT:                      ACTUAL: 0.0
----------------------------------------
```

FIG. 3F 5,508,977

SERVICE TECHNICIAN TIME RECORDER

BACKGROUND

Many service departments such as in automobile dealerships rely on flat rates for particular services but also track the time required by service technicians to perform those services. The most widely used system for tracking those services and times is through use of daily time and operation ticket forms, such as illustrated in FIG. 1A, in conjunction with side printing time recorders. Throughout a day, a service technician enters by pen, for each repair job, his employee number (EMP.), a repair order number (R.O. NO.), and a flat rate time (OPER. TIME). The flat rate time may be designated by the auto manufacturer as an appropriate and expected time to perform the particular job. As the technician begins a job, he inserts the form into a side printing time recorder which records the on time along the right edge of the form. When the job is complete, he again inserts the form into the time recorder to record an off time. He then calculates the actual time required to perform the repair job by subtracting the on time from the off time.

The daily time and operation ticket form includes a base card which receives a carbon copy of the information input onto a front sheet. The front sheet is perforated to allow that portion dealing with each repair job to be torn from the form. The sheet is adhesive backed so that the flag ticket which is torn from the form can be applied to the repair order. The daily time and operation ticket form also permits the technician to complete flag tickets for W-time (nonproductive, nonrepair times). W-time codes are entered in place of the repair order number. The most often used W-codes are for the repair and cleaning of equipment, tools and facilities; waiting time; training and shop conferences; paid holiday and other paid absences; and paid and unpaid work shop rectification.

At the end of the day, total times, including separate totals for W-time, and paid W-time must be computed and entered at the end of the form as a daily report. Additional reports are generated periodically by the dealership. For example, FIG. 1B illustrates an efficiency and productivity report for a technician. The weekly totals from the totals of daily time records are inserted into the form; and percent efficiency, equal to the total flat time divided by total actual repair time, and the percent productivity, equal to the total actual repair time divided by the total available time, are computed.

SUMMARY OF THE INVENTION

The present invention relates to a time recorder which not only provides the on and off times but also includes memory for receiving repair order numbers and flat rate times and then prints the required flag tickets on adhesive-backed paper. The system also permits automatic generation of records including time records and efficiency and productivity records.

In accordance with the present invention, a service technician time recorder includes an alphanumeric input key pad, a printer and a roll supply of adhesive-backed paper to the printer. Electronics in the time recorder include memory and a date and time clock. The electronics are programmed to respond to service technician inputs on the key pad to store in memory, for successive jobs by each of plural service technicians, time records. The time records include on and off times from the clock and job information such as a repair order number and a flat rate time. The electronics also controls printing of a flag ticket to be applied with adhesive backing to a repair order. The flag ticket includes an employee identification, repair order number, flat rate time, on and off times and actual repair time. The electronics also provide the time record data for printing of daily technician time cards. Although that data may be communicated to a computer or a separate printer, it is preferred that the printer that is used for the flag tickets print time records and efficiency and productivity reports on the same adhesive-backed paper.

Preferably, where a technician fails to enter such items as a repair order number or flat rate time, the printer identifies those missing items by print of a distinctive color on the flag ticket. The distinctive color may also identify warranty flag tickets. The electronics may print a report of those incomplete job records to enable a supervisor to complete the records.

Both technicians and supervisors may gain access to the system by inputting personal codes on the key pad. Preferably, supervisors gain supervisory access to the system by use of identification cards having magnetic stripes. Similar identification cards can be used to identify the technicians, or a bar code reading wand be provided to avoid the wear of frequent use of identification cards by the technicians. A sheet of bar codes may be provided with each technician's name entered next to one of the bar codes. Thus, to enter the time recorder, the technician need only scan the bar code associated with his name using the wand.

It is preferred that the system prevent a technician from storing an on time of a new job before he has entered an off time of a prior job. Preferably, the system responds to a technician's attempt to enter an on time before entering an off time of a prior job by printing a missed-punch alert which indicates a prior job in progress. It is also preferred that the system automatically print a flag ticket when an off time is entered.

In the supervisor mode, special labels on the alphanumeric keys may allow direct access to items of a supervisor menu. If a supervisor enters missed on and off times, such times are identified in time records as by an asterisk. The supervisor may print a jobs in progress report to assure that all time records have been properly completed. The supervisor should periodically purge past daily time records to save memory but the totals from those time records are saved in an historical memory file for creation of the efficiency and productivity records. The supervisor may be provided with a report of dates not purged.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1AA and 1AB illustrate a prior art daily time record with operation flag tickets.

FIG. 1BA and 1BB illustrate a prior art efficiency and productivity report generated from a compilation of daily time records for a technician.

FIG. 3A illustrates a flag ticket generated by the time recorder of FIG. 2.

FIG. 3B illustrates a daily time card for a technician generated by the time recorder of FIG. 2.

FIG. 3C illustrates a jobs in progress report generated by the time recorder of FIG. 2.

FIG. 3D illustrates an efficiency and productivity report generated by the time recorder of FIG. 2.

FIG. 3E illustrates a missed punch alert generated by the time recorder of FIG. 2.

FIG. 3F illustrates a red marked report generated by the time recorder of FIG. 2.

DETAILED DESCRIPTION OF A PREFERRED EMBODIMENT

The time recorder of the present invention is a calculating job cost recorder. It was designed for use in the service department of an auto dealership. It replaces existing side printing job cost recorders that are currently being used in conjunction with job cost time cards.

Figure 2A:
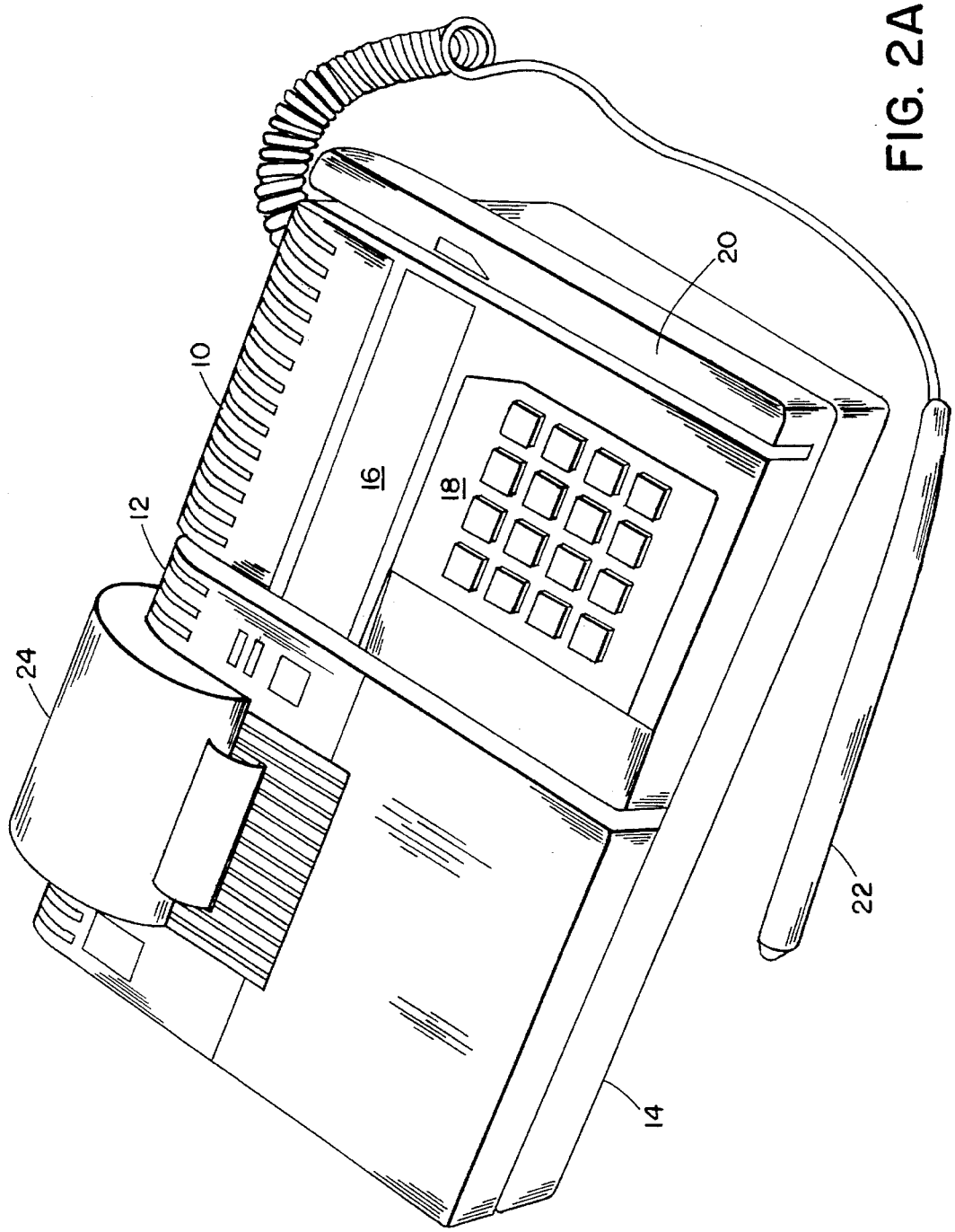
FIG. 2A illustrates a time recorder embodying the present invention.

As illustrated in FIG. 2A, the time recorder includes an input/output and processing unit 10 and a printer unit 12 mounted to a base 14. The unit 10 includes a display 16 and an alphanumeric key pad 18. It also includes a magnetic stripe reader 20 for receiving an identification card having a magnetic stripe thereon. An optional bar code reading wand 22 may also be provided. The printing unit 12 includes a roll supply 24 of adhesive-backed paper.

Figure 2B:
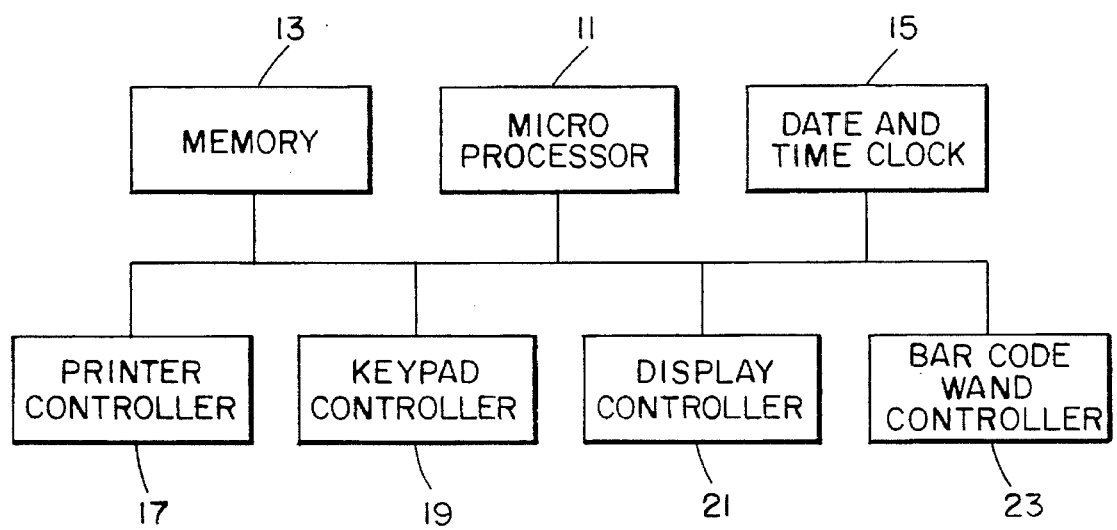
FIG. 2B is an electrical schematic of the electronics of the time recorder of FIG. 2A.

The time recorder is based on a Verifone Trans 380 terminal 10 connected to a Verifone P250 printer. As illustrated in FIG. 2B, the terminal 10 is a software based system which includes a microprocessor 11 and memory 13. It includes a date and time clock 15 which, though shown as a discrete element, is actually implemented in software. Printer, key pad, display and bar code wand controllers 17, 19, 21 and 23 are also included. A battery back-up (not shown) is included.

Figure 2C:
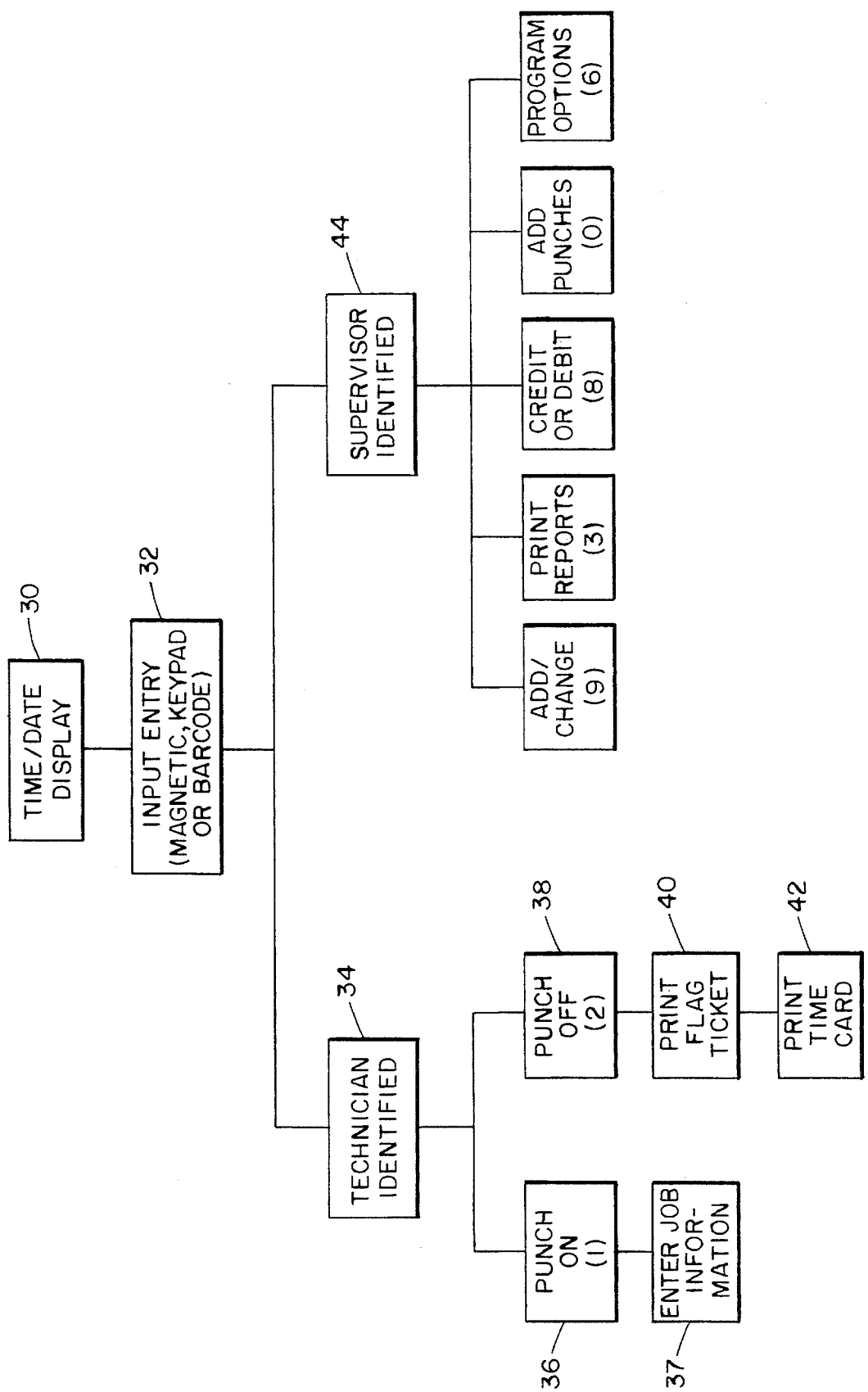
FIG. 2C is a flow chart of operation of the recorder of FIG. 2A.

As illustrated in the flow chart of FIG. 2C, the time and date are normally displayed at 30. A user enters a personal code or a magnetic card or uses the bar code probe at 32. The system may be operated in either technician or supervisor modes. In the technician mode, the technician identifies himself at 34 using the key pad 18 or optional bar code reading wand 22. A bar code chart may be provided with the time recorder, and employees are listed adjacent to corresponding bar codes. The technician enters on and off times by pressing the 1 and 2 keys respectively at 36 and 38. If the on time key is pressed at 36, the technician may enter W-codes or repair order number and flat rate time at 37 in response to display prompts by way of the key pad 18. If the off time key is pressed at 38, a flag is printed at 40. A full time card may be printed at 42 following user prompts. In the supervisor mode, a supervisor identifies himself at 44 using the key pad or a magnetic stripe card passed through the reader 20. Several function labels are provided on the key pad at the keys indicated in FIG. 2C to provide ready access to supervisor menus as discussed below.

The time recorder stores time punches and calculates elapsed time for up to 50 employees for a period of no less than five days. The strength of the time recorder comes from its ability to mirror the manual system that the auto service departments are currently using. The time recorder replaces a time card/side printer system with very little system adaption required on the part of the user.

The time recorder keeps track of all flat-rate times for each technician as well as actual time and accumulates efficiency and productivity totals for up to one month. The time recorder has battery back-up for time and data protection during power failures. Automatic Daylight Saving Time changes are standard. Because of the different user requirements for management control, the time recorder is able to satisfy all three of the following operation scenarios:

Scenario 1
  Office issues repair order to the Technician
  Technician enters punch transactions on the time card (time recorder)
  Technician enters the repair order number
  Technician enters the Flat Rate time
  Technician sticks flag ticket to the back of the repair order at job completion Scenario 2
  Office issues repair order to the Technician Technician enters punch transactions on the time card (time recorder)
  Technician enters the repair order number
  Office enters the Flat Rate time at job completion (for payroll control)
  Office sticks flag ticket to the back of the repair order at job completion Scenario 3
  Office performs all of the transactions listed above In scenario 2, the office keeps track of all completed jobs on a log and then enters the flat rate times at convenient times throughout the day. In scenario 2:

Office hand writes flat rate times on the flag tickets
  Office keeps running list of the repaid order #, file #, and flat rate time for the job
  Office edits daily files stored in the time recorder at a convenient break during the day During daily operation, each technician punches "on" and "off" each repair job that he or she has worked on during that day. At the instant of the "off" punch, the time recorder immediately prints a "flag" ticket as illustrated in FIG. 3A. The flag ticket lists the on and off punches, the total of elapsed time (actual repair time) between punches, the repair order number, and the flat rate time for that job. One can reproduce this flag ticket if necessary by using the unique file number appearing on each flag ticket or time card.

Any punch other than the normal ON/OFF sequence, such as two ON punches or two OFF punches in a row, is not allowed by the time recorder. An error message explaining the situation is printed on the printer as illustrated in FIG. 3E. The recorder may also allow any technician to print his or her daily time card.

A supervisor may print any of the following standard reports: 1. daily employee time card report, 2. jobs in progress report, 3. efficiency and productivity reports, 4. date not purged report, and 5. red mark punches report. In addition, the supervisor may reprint a flag ticket at any time prior to the data being purged from memory.

The supervisor can print a technician's daily time card as illustrated in FIG. 3B at any time. The card is also automatically printed at 2 a.m. The daily time card shows and totals each ON/OFF operation including repair order numbers and flat-rate times. Daily totals posted on the card include available time, actual time, paid W-time (unproductive codes), unpaid W-time, and flat-rate time. Omissions, such as missing repair order numbers or missing flat-rate times, are printed in red so that one can easily spot them for additions and corrections.

The jobs in progress report, illustrated in FIG. 3C, is a management tool used to determine which jobs have not been completed, which technician is working on them, and when each incomplete job was started. Typically, this report would be run periodically during the day by the supervisor to determine which job each technician is working on.

The efficiency and productivity report of FIG. 3D is a management tool used to determine the efficiency and productivity for each technician. Efficiency is the ratio of flat rat time to actual time and productivity is the ratio of actual time to available time. This report lists all technician by badge number and totals for their available time, actual time, w-time (non-productive), flat rate time, % efficiency and % productivity. The bottom of this report lists a combined total for each of these time categories for all of the technicians loaded into the recorder. Typically this report would be run weekly by the supervisor after the weeks punch data has been purged from the clock.

Red marks on a time card or flag ticket usually indicate missing information. The time recorder allows the supervisor to correct these omissions. Instead of looking through all of the time card punches, the red mark punches report of FIG. 3F prints only the red-marked items and their corresponding file numbers for easy access.

The time recorder is a memory-sensitive device. The supervisor must purge data or punches on a daily basis. This means that after a particular day's time cards have been corrected and printed, the supervisor must remove that day from the terminal. The dates not purged report tells the supervisor all dates not yet purged.

More specifically, the time recorder stores information on two levels: 1. daily records of technician transactions, and 2. historical records of daily totals used to calculate efficiency and productivity reports.

Daily records of technician activity are kept in memory until all errors have been corrected and error free time cards have been printed for management records. Daily punch records are purged from memory once all corrected time cards have been printed. Purging the daily records automatically moves the daily totals into a historical file.

The historical file of the daily time card records is used to calculate the efficiency and productivity reports. These reports may be run for any dates that have been purged from memory. The efficiency and productivity file must be purged from memory monthly. Once the efficiency and productivity reports have been run, this information must be purged by date from memory to make room for future punch data. A dates-not-purged report may be run to identify all the dates with punch data which is currently held in memory.

Figure 4:
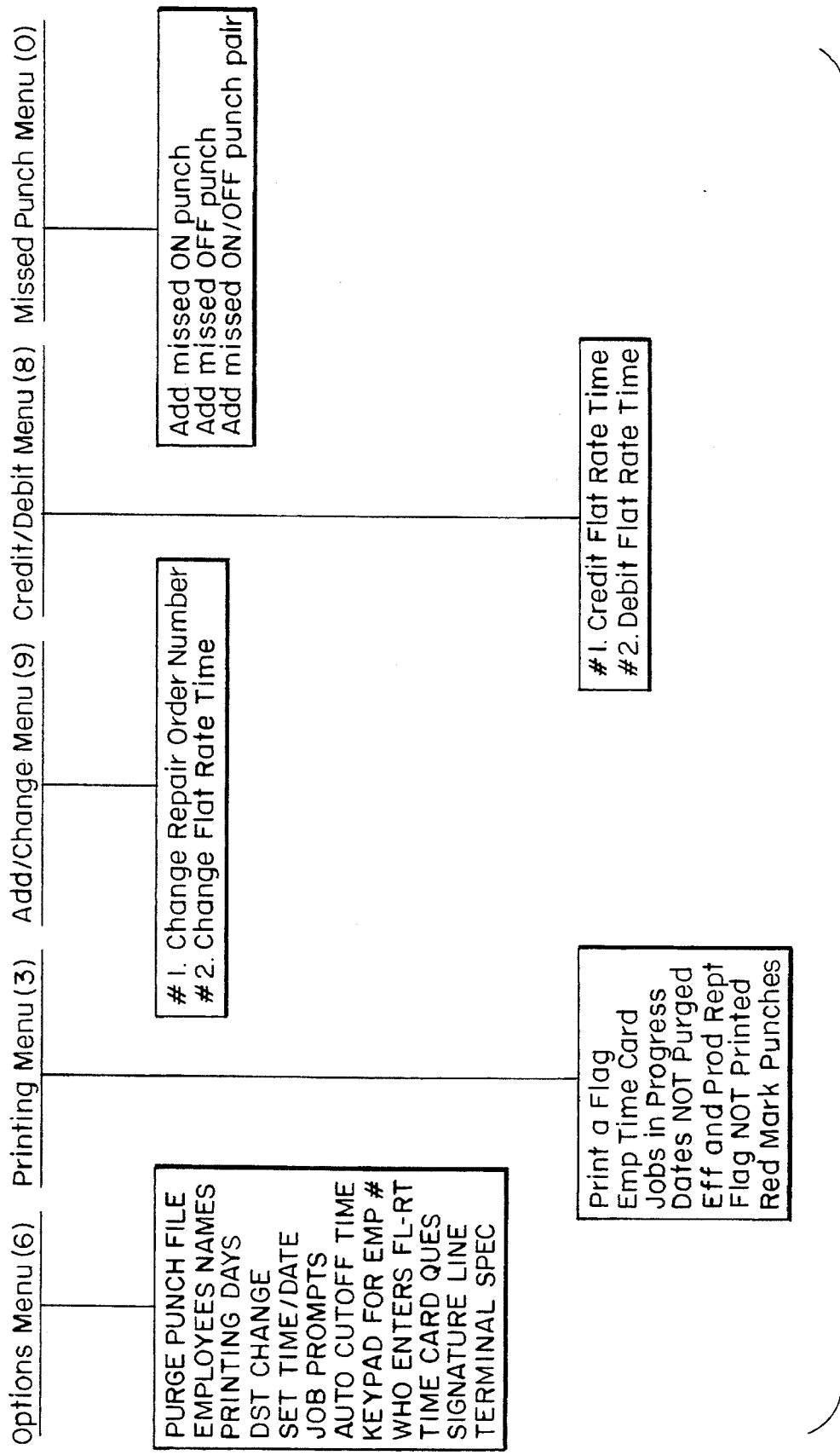
FIG. 4 illustrates the menu options provided on the display of the time recorder of FIG. 2 with selection of one of the options through the keypad.

Operation of the system in the supervisor mode is as follows. Using his identification badge, the supervisor accesses the functions presented in FIG. 4. For direct access to each of the five menus of FIG. 4, one of the keys of the key pad 18 is labeled for that menu. Specifically, by punching key 6 in response to a prompt on display 16, the options menu is obtained. Key 3 accesses the printing menu, key 9 accesses the add/change menu, key 8 accesses the credit/debit menu and key 0 accesses the missed punch menu. Within each menu, a particular item displayed on display 16 may be accessed using the up and down keys. The items listed in the menus allow the following functions:

OPTIONS MENU (6)
Employee (Technician Names)—The technician option allows the supervisor to add or delete up to 50 technician names that correspond to numbers 1–50. These numbers and names appear on all reports.
Printing Days—Time cards are printed at 2 a.ma. This option tells the terminal which days of the week to print.
Daylight Savings Time Change—This is where the dates are stored for the Spring and Fall time changes. The supervisor can enter the changes once each year.
Set Time and Date—If the time and date in the terminal must be set, this option steps the supervisor through the process.
Add Second Job Prompt—To show more information on the flag ticket or time card such as line number or operation number, this option allows a second prompt. Technicians can then enter the corresponding information through the keypad.
Set "Automatic Cut-Off Time"—The automatic cut-off time is the default time used to punch a technician OFF if the technician forgets to punch out when going home. The time recorder must have a completed ON/OFF punch to process the daily time cards. The default time is midnight, but can be set to any hour the supervisor chooses.
Set "Keypad Entry for Employees"—By answering YES to this option, the supervisor allows the technicians to use the keypad to enter their technician number instead of using the bar code wand across the chart. The default is YES.
Set "Who Enters Flat Rate Time"—By answering NO to this option, the technicians are not allowed to enter the flat rate for each job. No flat rate appears on any reports and the supervisor has to enter the flat rate time later. The default is YES.
Set "Time Card Question Prompt"—By answering NO to this option, the time recorder asks the technician about printing his or her own time card. By answering YES to this option, the technician is allowed to print and take home his or her own time card at the end of the day. All time cards are still printed at 2 a.ma. no matter what the setting. The default is YES.
Set "Print Signature Line"—By answering NO to this option, the time card prints without a signature line. A signature line is used to verify the hours worked by the technician. The default is YES.
Print System Specifications—This options allows the supervisor to print out all of the specifications chosen for the time recorder including all of the current technicians. The supervisor can print the specification at any time.

OTHER SUPERVISOR FUNCTIONS
It may be necessary for a supervisor to edit information stored in the time recorder, usually because of missed punches due to operator error or omitted information. With the use of the supervisor badge, the supervisor may gain access to the terminal editing functions to add missing information or to change incorrect information. The supervisor may add a missing on or off punch or an on/off punch pair. Added punches are identified by a preceding asterisk. In addition, the supervisor may add or change flat rate times and repair order numbers. The time recorder also allows a supervisor to credit or debit flat rate time for any technician to compensate or charge him for returned repairs or errors in flat rate times. The supervisor will also be able to print reports and purge punch data from the terminal memory while in "supervisor mode." The printing menu (key 3) allows the supervisor to print a flag ticket or any of the five available reports.
Add/Change Key (#9)—This function allows the supervisor to add a repair order number to a particular ON/OFF operation where not exists. It also allows the supervisor to change an existing repair order number as needed. This is done with the file number shown on each ON/OFF operation. The add/change key also applies to adding or changing flat-rate times on any ON/OFF operation.

Credit/Debit Key (#8)—This functions allows the supervisor to add or take away flat-rate times from a technician to accommodate call back or errors. The supervisor can reference a particular repair order when issuing a credit or debit. These entries appear on the time card with an ON and OFF punch of 18:00 and include an "*."

Missed Punch Menu (#0 key)—This function allows the supervisor to add a missed ON or OFF punch. As an example, a technician may go to lunch and forget to punch OFF. When the technician comes back from lunch and tries to punch ON, the time recorder will not allow this punch.

A "MISSED PUNCH ALERT" is printed and the supervisor must manually punch in OFF. A missed OFF or missed ON punch is distinguished by an "*" after the ON or OFF print. The missed punch menu also has a provision for adding a missed pair of punches to a technician's time card.

Supervisor Operation

A typical daily supervisor operation consists of the following:

At the end of the day, run a Red Mark Punch report

Run a Jobs in Progress report

Fix all missing information and add "off" punches for any technicians that have forgotten to punch off of their last job prior to going home Run Red Mark report to verify that all corrections have been made Verify that yesterday's time cards are on file for the payroll records If the cards are not on file, reprint all time cards for yesterday Run a Dates Not Purged report Purge the Daily totals for all dates not purged excluding Today and Yesterday The time recorder automatically prints all technician time cards at 2:00 a.ma.

A typical monthly supervisor operation consists of the following:

Run a Dates Not Purged report

Verify that the time cards for the dates not purged are on file for the payroll records Purge the dates not purged from the daily file (excluding the current day)

Run the Efficiency and Productivity report for the previous month

Purge the Efficiency and Productivity report for the previous month

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A service technician time recorder comprising:

an alphanumeric input key pad;

a printer;

a roll supply of adhesive-backed paper to the printer; and electronics, including memory and a date and time clock, responsive to the key pad to control the printer, the electronics being programmed to:

respond to service technician inputs on the key pad to store in memory, for successive jobs by each of plural service technicians, time records including on and off times from the clock and job information;

print a flag ticket to be applied with adhesive backing to a job order, the flag ticket including an employee identification, time information and job information; and provide the data printed on each flag ticket for printing of daily technician time cards.

2. A time recorder as claimed in claim 1 wherein items not entered in memory are identified on flag tickets by a distinctive print color.

3. A time recorder as claimed in claim 1 wherein the electronics are programmed to print a report of incomplete time records.

4. A time recorder as claimed in claim 1 wherein the electronics is programmed to print the time cards on the adhesive-backed paper.

5. A time recorder as claimed in claim 1 wherein the electronics are programmed to print out an efficiency end progress report on the adhesive-backed paper.

6. A time recorder as claimed in claim 1 further comprising a magnetic stripe reader.

7. A time recorder as claimed in claim 1 further comprising a bar code reading wand.

8. A time recorder as claimed in claim 1 wherein the electronics are programmed to respond to technician inputs on the key pad and print flag tickets in a technician mode and to print time cards and efficiency and progress reports in a supervisor mode.

9. A time recorder as claimed in claim 1 wherein the job information includes job number and flat rate.

10. A service technician time recorder comprising:

an alphanumeric input key pad;

a display for providing visual prompts;

a roll supply of adhesive-backed paper to the printer;

a magnetic stripe reader; and electronics, including memory and a date and time clock, responsive to the key pad and magnetic stripe recorder to control the display and printer, the electronics being programmed to:

respond to service technician inputs on the key pad to store in memory, for successive jobs of plural service technicians, time records including on and off times from the clock and, for repair jobs, a repair order number and a flat rate time;

print a flag ticket for each repair job to be applied with adhesive backing to a repair order;

respond to the magnetic stripe reader to identify a supervisor;

respond to supervisor inputs on the key pad to add to time records; and respond to supervisor inputs on the key pad to print a technician daily time card on the adhesive-backed paper and to print an efficiency and productivity report on the adhesive-backed paper.

11. A time recorder as claimed in claim 10 wherein items not entered in memory are identified on flag tickets in a distinctive print color.

12. A time recorder as claimed in claim 10 wherein the electronics are programmed to print a report of incomplete job records.

13. A time recorder as claimed in claim 10 wherein warranty flag tickets are identified by printing of a distinctive color.

14. A time recorder as claimed in claim 10 wherein the electronics are programmed to respond to a technician attempt to enter an on time before entering an off time of a prior job by printing a missed punch alert which indicates a prior job in progress.

15. A time recorder as claimed in claim 10 wherein a flag ticket is automatically printed when an off time is entered.

16. A time recorder as claimed in claim 10 wherein the individual alphanumeric keys are further labelled with items of a supervisor menu.

17. A time recorder as claimed in claim 10 wherein a supervisor may enter missed on and off times, and such times entered by the supervisor are identified in time records.

18. A time recorder as claimed in claim 10 wherein the electronics are programmed to print a jobs in progress report.

19. A time recorder as claimed in claim 10 wherein the electronics are programmed to respond to a supervisor input to purge past daily time records while retaining totals from those time records in a historical memory file.

20. A time recorder as claimed in claim 19 wherein the electronics are programmed to respond to a supervisor to print a report of dates not purged.

21. A time recorder as claimed in claim 10 further comprising a bar code reading wand.

22. A service technician time recorder comprising:

an alphanumeric input key pad;

a display for providing visual prompts;

a multi-color printer;

a roll supply of adhesive-backed paper to the printer;

a magnetic stripe reader; and electronics, including memory and a date and time clock, responsive to the key pad and magnetic stripe recorder to control the display and printer, the electronics being programmed to:

respond to service technician inputs on the key pad to store in memory, for successive jobs of each of plural service technicians, time records including on and off times from the clock, and for repair jobs, a repair order number and a flat rate time, the electronics preventing a technician from storing an on time of a new job until a prior job has an off time;

print a flag ticket for each repair job to be applied with adhesive backing to a repair order, the flag ticket including an employee identification, repair order number, flat rate time on and off times and actual repair time, repair order numbers and flat rate times not stored in memory being indicated by a printout of distinctive color;

respond to the magnetic stripe reader to identify a supervisor;

respond to supervisor inputs on the key pad to add to time record;

respond to supervisor inputs on the key pad to print a technician daily time card on the adhesive-backed paper, the time card including, for each repair job of a designated employee during the day, on and off times, actual repair time, repair order number and flat rate time, and to print daily totals of flat rate time, actual repair time, nonrepair time, and total paid nonrepair time; and respond to supervisor inputs on the key pad to print an efficiency and productivity report on the adhesive-backed paper, the efficiency and productivity report including for each of plural employees and for a period of time, total times, percent efficiency of total flat rate time per total actual repair time, and percent productivity of total actual repair time per total available time.

* * * * *